United States Patent Office 3,108,008
Patented Oct. 22, 1963

3,108,008
GYPSUM COMPOSITION AND METHOD
Ellis Gray King and Carl Adolphson, Bellingham, Wash., assignors to Puget Sound Pulp & Timber Co., Bellingham, Wash., a corporation of Delaware
No Drawing. Filed Apr. 29, 1960, Ser. No. 25,537
31 Claims. (Cl. 106—111)

This invention relates to gypsum compositions and has particular reference to the preparation of dehydrated or calcined gypsum slurries of improved properties.

This application is a continuation-in-part of our co-pending applications Serial Nos. 694,733, filed November 6, 1957, and now Patent No. 3,007,910, on "Treated Sulfonated Lignin-Containing Materials, and Process for Producing Same"; 433,794 filed June 1, 1954, and now abandoned, on "Process of Improving the Effectiveness of the Components of Spent Sulfite Liquor and the Products Thereof"; 539,542, filed October 10, 1955, and now Patent No. 2,935,504, on "Process of Improving the Effectiveness of the Components of Spent Sulfite Liquor and the Products Thereof," and 815,294, filed May 25, 1959, and now Patent No. 2,935,473, on "Drilling Fluid Composition and Process." Those applications disclose novel dispersing agents including salts of sulfonated lignin-containing materials such as spent sulfite liquor, the salts having a cation selected from the group consisting of iron, aluminum, chromium, copper and mixtures thereof, as well as such salts of oxidized lignosulfonates, and oxidized lignosulfonate per se. The present invention relates to the use of these dispersing agents as additives to gypsum slurries utilized in the manufacture of wallboard, lath, plaster board, sheathing and the like.

A primary object of the present invention is to provide novel gypsum compositions and products containing specially selected sulfonated lignin-containing materials.

A further object of the present invention is to provide a novel method for reducing the water requirements of gypsum slurry compositions.

Other objects and advantages of the present invention it is believed will be readily apparent from the following detailed description of preferred embodiments thereof.

Briefly, this invention comprehends within its scope the discovery that greatly improved gypsum compositions are provided by the addition to gypsum slurries of the water soluble lignosulfonate materials. The sulfonated lignin materials useful in the present invention are fully disclosed in the above-identified applications, the disclosures thereof being incorporated herein by reference. Briefly, these materials comprise: (1) the iron, aluminum, chromium or copper salts, or mixtures of these salts, of sulfonated lignin-containing materials such as those obtained from the pulping of wood and other lignocellulosic material, for example, spent sulfite liquor obtained from the pulping of wood by the neutral and acid bisulfite process, sulfonated Kraft process lignin and sulfonated soda lignin; (2) oxidized salts of the same categories; (3) such sulfonated lignin-containing materials which have been oxidized without the formation of the named salts; and (4) alkali treated sulfonated lignin-containing materials, including spent sulfite liquor as well as the materials of categories (1), (2) and (3). Oxidation is accomplished by reaction of the sulfonated lignin-containing material or salts thereof with an oxidizing agent having an oxidation power stronger than an oxidation potential of about −1.3, such agents including hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

The additives of the present invention effectively reduce the amount of water required to make a plastic slurry with gypsum, providing the following valuable advantages: (1) more rapid drying of the formed products, or the application of less heat in drying such products; (2) less water need be transported and handled; (3) greater strength in the formed product.

As little as 0.01% of the additives of the present invention, based on the weight of the gypsum, can have an effect in reducing the water requirement of the gypsum. An amount greater than about 1% by weight of the gypsum is not usually commercially practicable and for most purposes smaller amounts produce effective results. The preferred range is between at least about 0.1% and about 0.5% of the lignosulfonate additives of this invention, based on the weight of the gypsum. The additives are preferably added to the gypsum mix in the dried powder form, but aqueous solutions thereof can be used if desired. Larger amounts of additive may be used when a hard nonporous surface is desired. The higher concentration of additive forms a hard non-porous surface good for painting and resistant to adsorption of moisture. About 5% or more of the additive is suitable for this purpose.

The following specific examples are illustrative of the present invention, but it is to be understood that the invention is not to be limited to the specific details thereof:

In carrying out the examples, specimens of plaster were prepared and tested for consistency by the method reported in "Consistency Classification of Industrial Plasters," C. M. Lambe and J. S. Offutt. The American Ceramic Society Bulletin, vol. 33, No. 9: 272–276, September 15, 1959. Briefly, 50 g. of gypsum is sifted into 30 ml. of water containing the material whose effect it is desired to measure and the resulting plaster slurry is poured under carefully controlled conditions onto a glass plate. The diameter of the resulting patty is immediately measured. The larger the diameter the more fluid the material. The range of values obtained with this test is not great, but a difference of more than 0.2 is a significant difference between tests made on different additives. The gypsum used was "Pyrofill" (registered trademark of United States Gypsum of Chicago, Illinois, for a gypsum stucco containing wood fiber used for making lightweight gypsum concrete). In these tests the additive of the present invention was compared with the conventional fermented spent sulfite liquor solids prepared by fermenting, steam stripping and spray drying the liquor obtained from the calcium bisulfite pulping of soft wood chips.

The several additives were prepared as follows:

Alkali treated spent sulfite liquor was prepared in accordance with the process of our co-pending application Serial No. 694,733, filed November 6, 1957, by heating concentrated fermented calcium base spent sulfite liquor having approximately 48% non-volatile solids to 80 to 90° C., adding a 50% solution of sodium hydroxide to raise the pH to 8.0 and digesting the mixture at 80 to 90° C. for 24 hours while adding sodium hydroxide to maintain the pH at 8.0.

The iron salt of sodium dichromate oxidized alkaline treated spent sulfite liquor was prepared by adding 20% of ferric sulfate (24.5% Fe) as a 30% solution and 4% of sulfuric acid as a 25% solution based on non-volatile solids to the alkaline treated spent sulfite liquor. The mixture was then diluted to approximately 40% non-volatile solids and heated to about 60° C. Next 7% of sodium dichromate dihydrate based on the spent sulfite liquor solids was added with vigorous stirring. The product mixture was heated to 80° C., centrifuged hot to remove calcium sulfate and dried in a commercial spray drier. The product had a pH of about 4.2.

The aluminum salt of sodium dichromate oxidized, alkaline treated spent sulfite liquor was prepared by adding 160 grams of 40% solution of aluminum sulfate and 24 grams of 25% sulfuric acid to 500 g. of alkalin treated spent sulfite liquor solution containing 200 g. of non-volatile solids, prepared as described above, heating the mixture to 63° C. and adding 80 ml. of sodium dichromate solution containing 16 grams of sodium dichromate with vigorous stirring. The product was heated 2 hours at 75° C., centrifuged hot to remove calcium sulfate, pH 4.4, and dried in air at 45° C.

The iron salt of alkaline treated spent sulfite liquor oxidized with hydrogen peroxide and sodium dichromate was prepared by first adding 1.37% of hydrogen peroxide based on spent sulfite liquor solids as a 30% solution to the hot (60° C.) alkaline treated spent sulfite liquor with vigorous stirring. After a test with KI showed no more hydrogen peroxide, 20% of ferric sulfate based on spent liquor solids was added as a 40% solution and the mixture warmed to 50° C. Then 4% of sodium dichromate based on the spent sulfite liquor solids was added as a 20% solution with vigorous stirring and the mixture heated 2 hours at 90° C., centrifuged hot to remove calcium sulfate and dried in air at 60° C.

The 2.7% hydrogen peroxide oxidized alkaline treated spent sulfite liquor was prepared by adding 1% of sodium hydroxide based on the spent sulfite liquor solids to the above alkaline treated spent sulfite liquor having 10% by weight of non-volatile solids, and then 2.7% of hydrogen peroxide was added as a 30% solution with stirring. The mixture was allowed to stand overnight at room temperature, neutralized to pH 6 with sulfuric acid, centrifuged to remove calcium sulfate and dried at 60° C.

The 8% hydrogen peroxide oxidized alkaline treated sepnt sulfite liquor was prepared by adding 10% of sodium hydroxide based on spent sulfite liquor solids to the above alkaline treated spent sulfite liquor diluted to 10% by weight of non-volatile solids, and stirring in 8% of hydrogen peroxide as a 30% solution. After 30 minutes no test for hydrogen peroxide was obtained with KI and the mixture was neutralized to pH 6 with sulfuric acid, centrifuged to remove calcium sulfate, and dried in air at 60° C.

The 50% hydrogen peroxide oxidized alkaline treated spent sulfite liquor was prepared by adding 10% of sodium hydroxide based on spent sulfite liquor solids to the above alkaline treated spent sulfite liquor diluted to 10% by weight of non-volatile solids, stirring in 50% of hydrogen peroxide and allowing the mixture to stand one hour at room temperature. The mixture was then heated at 75° C. for 30 minutes, neutralized to pH 6 by adding sulfuric acid, centrifuged to remove calcium sulfate and dried in air at 60° C.

The aluminum salt of fermented spent sulfite liquor was prepared as follows: Twenty gals. of fermented calcium base spent sulfite liquor, containing 100 lbs. of solids, was placed in a stainless steel kettle and stirred with a Lightnin mixer. Twenty-five pounds of papermaker's alum (17% $Al_2O_3$) was dissolved in water and added to the hot (75-80° C.) fermented liquor. The whole was stirred for two hours, then covered and allowed to stand for settling of the calcium sulfate. The next day the pH was 2.5, and was adjusted to 4.0 by slowly adding 2.5 kg. of NaOH as a 25% solution.

The product solution, containing 42.2% total solids, was then clarified in a centrifuge.

The peroxide oxidized aluminum salt of fermented spent sulfite liquor was prepared as follows: Fifty grams of the aluminum salt of fermented spent sulfite liquor described above was dissolved in water to make approximately a 20% solution. Ten grams of a solution of hydrogen peroxide of about 25% concentration (thus about 2.5 grams of $H_2O_2$) was stirred in at room temperature. The mixture was then put on a steam bath for one hour, at the end of which time the potassium iodide test for peroxides was negative. The product was dried at pH 4 at about 50° C.

The following table sets forth the results of the consistency tests:

Table

| Description of Additive Tested | Additive Amount (g./50 g. gypsum) | Diameter of Patty, Inches |
|---|---|---|
| Fermented spent sulfite liquor solids | 0.1 | 2.8 |
| Alkali treated fermented spent sulfite liquor solids | 0.1 | 3.0 |
| Iron salt of sodium dichromate oxidized alkali treated fermented spent sulfite liquor solids | 0.1 | 3.5 |
| Aluminum salt of sodium dichromate oxidized alkali treated fermented spent sulfite liquor solids | 0.1 | 3.4 |
| Iron salt of alkali treated fermented spent sulfite liquor solids oxidized with hydrogen peroxide and sodium dichromate | 0.1 | 3.3 |
| Hydrogen peroxide (8%) oxidized alkali treated fermented spent sulfite liquor solids | 0.1 | 3.3 |
| Hydrogen peroxide (50%) oxidized alkali treated fermented spent sulfite liquor solids | 0.1 | 3.3 |
| Aluminum salt of fermented spent sulfite liquor solids | 0.1 | 3.1 |
| Peroxide oxidized aluminum salt of fermented spent sulfite liquor solids | 0.1 | 3.5 |
| Peroxide oxidized aluminum salt of fermented spent sulfite liquor solids | 0.5 | 4.5 |

With reference to the above table, the test results show that the alkaline treated spent sulfite liquor is an unexpectedly better dispersing agent for plaster than is conventional spent sulfite liquor and that further unexpected improvement is obtained by oxidation and by oxidation together with the formation of the metal salts herein disclosed.

Having fully described our invention, it is to be understood that we do not wish to be limited to the details set forth, but our invention is of the full scope of the appended claims.

We claim:

1. A method for reducing the ratio of water to calcined gypsum required in making a plastic slurry comprising calcined gypsum and water, which comprises the step of incorporating in the slurry from about 0.01 to about 5% by weight, based on the weight of said gypsum of a water soluble alkali-treated sulfonated lignin-containing material.

2. A method for reducing the ratio of water to calcined gypsum required in making a plastic slurry comprising calcined gypsum and water, which comprises the step of incorporating in the slurry from about 0.01 to about 5% by weight, based on the weight of said gypsum of a water soluble salt of a sulfonated lignin-containing material, said salt having a cation selected from the group consisting of iron, aluminum, chromium, copper and combinations thereof.

3. The method of claim 2 wherein the sulfonated lignin-containing material is obtained from spent sulfite liquor.

4. The method of claim 3 wherein said sulfonated lignin-containing material is obtained from spent sulfite liquor and wherein said salt is oxidized by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

5. The method of claim 2 wherein the sulfonated lignin-containing material is alkali-treated.

6. The method of claim 2 wherein the cation is iron.

7. The method of claim 2 wherein the cation is aluminum.

8. The method of claim 4 wherein the cation is iron and the oxidizing agent is an alkali metal chromate.

9. The method of claim 4 wherein the cation is aluminum and the oxidizing agent is hydrogen peroxide.

10. The method of claim 4 wherein the cation is chromium and the oxidizing agent is an alkali metal chromate.

11. A method for reducing the ratio of water to calcined gypsum required in making a plastic slurry comprising calcined gypsum and water, which comprises the step of incorporating in the slurry from about 0.01 to about 5% by weight, based on the weight of said gypsum of water soluble, oxidized sulfonated lignin-containing material said material oxidized with an oxidizing agent having an oxidizing power stronger than an oxidation potential of about −1.3.

12. The method of claim 11 wherein said sulfonated lignin-containing material is obtained from spent sulfite liquor and wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

13. A gypsum product comprising a set mass of gypsum crystals having uniformly dispersed therein from about 0.01% to about 5% by weight, based on the weight of said gypsum of a water soluble alkali-treated sulfonated lignin-containing material.

14. A gypsum product comprising a set mass of gypsum crystals having uniformly dispersed therein from about 0.01% to about 5% by weight, based on the weight of said gypsum of water soluble salt of a sulfonated lignin-containing material, said salt having a cation selected from the group consisting of iron, aluminum, chromium, copper and combinations thereof.

15. The product of claim 14 wherein the sulfonated lignin-containing material is obtained from spent sulfite liquor.

16. The product of claim 14 wherein said sulfonated lignin-containing material is obtained from spent sulfite liquor and wherein said salt is oxidized by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

17. The product of claim 1 wherein 4the sulfonated lignin-containing material is alkali-treated.

18. The product of claim 15 wherein the cation is iron.

19. The product of claim 15 wherein the cation is aluminum.

20. The product of claim 16 wherein the cation is iron and the oxidizing agent is an alkali metal chromate.

21. The product of claim 16 wherein the cation is aluminum and the oxidizing agent is hydrogen peroxide.

22. The product of claim 16 wherein the cation is chromium and the oxidizing agent is an alkali metal chromate.

23. A gypsum product comprising a set mass of gypsum crystals having uniformly dispersed therein from about 0.01% to about 5% by weight, based on the weight of said gypsum of a water soluble, oxidized sulfonated lignin-containing material, said material oxidized with an oxidizing agent having an oxidizing power stronger than an oxidation potential of about −1.3.

24. The product of claim 13 wherein the salt is oxidized by any oxidizing agent, wherein said sulfonated lignin-containing material is obtained from spent sulfite liquor and wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

25. The method of claim 4 wherein the sulfonated lignin-containing material is alkali-treated.

26. A method for reducing the ratio of water to calcined gypsum required in making a plastic slurry comprising calcined gypsum and water, which comprises the steps of incorporating in the slurry from about 0.01% to about 5% by weight, based on the weight of said gypsum of an additive, said additive being prepared by complexing sulfonated lignin-containing material with a metal selected from the group consisting of iron, aluminum, chromium, copper and mixtures thereof, to produce a water soluble product, and confining the resulting plastic slurry to a desired form until the plastic slurry mixture has set to form a solid mass.

27. A plastic slurry comprising calcined gypsum, water, and an additive, said additive comprising the product prepared by complexing sulfonated lignin-containing material with a metal selected from the group consisting of iron, aluminum, chromium, copper and mixtures thereof to produce a water soluble product, said additive being present in an amount of from about 0.01% to about 5% by weight, based on the weight of said gypsum.

28. The method of claim 3 wherein said salt is oxidized by electrolytic oxidation.

29. The method of claim 11 wherein said material is oxidized by electrolytic oxidation.

30. The product of claim 14 wherein said salt is oxidized by electrolytic oxidation.

31. The product of claim 13 wherein said salt is oxidized by electrolytic oxidation.

References Cited in the file of this patent

UNITED STATES PATENTS

| | | |
|---|---|---|
| 2,662,024 | Riddell et al. | Dec. 8, 1953 |
| 2,856,304 | Kirk | Oct. 14, 1958 |
| 2,857,288 | Albrecht et al. | Oct. 21, 1958 |